3,833,735
GERMICIDAL USE OF 2,3,3-TRI-IODO-ALLYLALCOHOL

Sadaaki Mase and Shigeo Seki, Tokyo, Fumio Kai, Fujisawa, Tetsuro Watanabe, Yokohama, and Michiaki Iwata, Kawasaki, Japan, assignors to Meiji Seika Kaisha, Ltd., Tokyo, Japan
No Drawing. Filed Apr. 17, 1973, Ser. No. 352,072
Claims priority, application Japan, Apr. 16, 1972, 47/41,351
Int. Cl. A01n 9/24
U.S. Cl. 424—343       2 Claims

ABSTRACT OF THE DISCLOSURE 2,3,3-Tri-iodo-allylalcohol is now found to be useful as a germicide of a low toxicity to control the growth of various bacteria and fungi which infest in crop plants, deteriorate organic material and/or form the slime occurring in the paper-making process.

---

This invention relates to a germicidal agent and a germicidal method using 2,3,3-tri-iodo-allylalcohol as the active substance. More particularly, an aspect of the present invention is directed to a germicidal agent or composition which comprises 2,3,3-tri-iodo-allylalcohol as the active ingredient and a carrier for the active ingredient. A second aspect of the present invention is directed to a method of controlling the growth of bacteria and fungi, which comprises applying thereto a toxic concentration of 2,3,3-tri-iodo-allylalcohol. The germicidal agent and method according to the present invention may be applied for many purposes in the field of agriculture and the field of industry such as fibre industry and paper-making industry, and also in the prevention of wood material and bamboo material.

It is often highly desirable that a germicidal agent of industrial utility would be non-toxic to animals and men, as there is a chance that the germicidal agent which has been incorporated into various materials such as fibre, paper, wooden products would be brought into contact with foodstuffs to be taken by men and also into contact with the body of men. In the past, however, there have been employed a variety of organic mercury compounds, organic tin compounds and organic chlorine-containing compounds as the active ingredient for the germicidal agent of industrial utility. While, it has been found that the organic mercury compounds have a risk that they would gradually be accumulated within the body of men in case they are occasionally often taken by men. Many reports have also been made to warn that the organic tin compounds as well as the organic chlorine-containing compounds can be toxic to men. In these circumstances, an urgent need occurs to replace the previous germicides of industrial utility by such a germicidal agent containing a safer compound having a lower toxicity or no toxicity as the active ingredient.

In the germicidal agents of agricultural utility, there have been similarly employed a variety of the organic mercury compounds, organic tin compounds and organic chlorine-containing compounds as the active ingredient thereof. The germicidal agents of agricultural utility have the same problem as the germicidal agents of industrial utility. In addition, it is very important to use a very less toxic compound as the active ingredient for the germicides of agricultural utility, because the agriculture where the germicides of agricultural utility are applied has a main misison to produce foodstuffs. Accordingly, a strong demand has been occurred to provide a germicidal agent of agricultural utility which contains a highly effective but less toxic compound as the active ingredient thereof.

Taking the above-mentioned problems into consideration, we have made our research to seek for such a compound which exhibits a wide range of antibacterial and antifungal spectrum and hence may be used effectively and extensively in the industrial field, in the agricultural field and also in the other many fields but which may be used with high safety because of its lower toxicity to animal and men. As a result of our research, we have now found that 2,3,3-tri-iodo-allylalcohol is a germicidal compound which can meet all our requirements and is highly active not only as the germicide of industrial utility but also as the germicide of agricultural utility.

2,3,3-Tri-iodo-allylalcohol exhibits a wide range of antibacterial and antifungal spectrum as demonstrated later, and this compound is very lower toxic as shown by the fact that when 5000 mg./kg. of this compound was given orally to mice to test the acute toxicity of this compound in mice, none of the mice so treated suffered death. When the toxicity of 2,3,3-tri-iodo-allylalcohol to fish was tested using red killifish, it has been found that the toxicity of this compound is very low sufficiently to enable this compound to be used as the active ingredient for a germicidal agent of agricultural utility which may be applied in paddy field of rice plant. 2,3,3-Tri-iodo-allylalcohol is a crystalline substance represented by the structural formula:

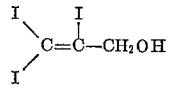

and a melting point of 151–152° C., and this compound is a known compound (as shown in Beilstein's "Organische Chemie," vol. I, p. 440). 2,3,3-Tri-iodo-allylalcohol may be produced in a high yield of 80% or more by reacting elementary iodine with propargyl alcohol in an aqueous medium and in the presence of a base such as sodium hydroxide to give 3-iodopropargyl alcohol and then addition-reacting a further amount of elementary iodine with the 3-iodopropargyl alcohol in the presence or absence of a similar base such as sodium hydroxide to produce 2,3,3-tri-iodo-allylalcohol.

2,3,3-Tri-iodo-allylalcohol exhibits a high, germicidal activity to a variety of bacteria and fungi but exhibits a low toxicity to animal and men as well as a low phytotoxicity to crop plants such as rice plant. Moreover, it has been found that 2,3,3-tri-iodo-allylalcohol exhibits a high activity inhibitory to the growth of such microorganisms as Aerobacter species, Penicillium species, Trichoderma species, Peacilomyces species, Humielola species and *Aspergillus niger* which usually would form the undesired slime frequently occurring in the paper-making process, and hence that 2,3,3-tri-iodo-allylalcohol is very much effective as the active ingredient for a slime-controlling agent.

In carrying out the method of the present invention, 2,3,3-tri-iodo-allylalcohol may be applied as such to the areas or material to be treated or may be incorporated as such into the materials to be treated at such a rate that is at least sufficient to provide a concentration of 2,3,3-tri-iodo-allylalcohol is toxic to bacteria and fungi. But 2,3,3-tri-iodo-allylalcohol may be formulated into a preparation or composition in an appropriate form such as a pulver, wettable powder, granule, pellet, concentrated emulsion, suspension and solution, depending upon the purpose for which 2,3,3-tri-iodo-allylalcohol is applied to. 2,3,3-Tri-iodo-allylalcohol may be used in admixture with a carrier or diluent, optionally together with a suitable filler and/or adjuvant. The carrier or diluent may be either a liquid or a solid which is chemically inert to the active ingredient compound. Suitable examples of the solid carrier or diluent include clay, kaolin, talc, diatomaceous earth, silica, vermiculite, calcium carbonate, sodium hydrogen carbonate and the like. Liquid carrier or diluent may be a solvent, for example, dimethylformamide, dimethylsulfoxide, dioxan, cyclohexane, methoxybutanol in which the active ingredient compound is soluble, or may be other liquid such as water, benzene, kerosene in which the active ingredient compound may be dispersed or dissolved with aid of a surface-active agent. Suitable examples of the liquid carrier or diluent include lower aliphatic alcohols such as methanol, ethanol, dioxane, acetone, cyclohexane, methoxybutanol, animal oil, vegetable oil and the like. In order to insure that effective application of 2,3,3-tri-iodo-allylalcohol can be achieved according to the present invention, it is preferred to apply the active compound in combination with spreading agent, wetting agent, sticking agent and/or emulsifying agent, particularly when 2,3,3-tri-iodo-allylalcohol is applied as a germicide of agricultural utility. As the adjuvant such as spreading agent, wetting agent, sticking agent and/or emulsifying agent, there may be used a variety of surface-active agents such as aliphatic polyhydric alcohols, for example, ethylene glycol, glycerine and butylene glycol and their aliphatic acid ester derivatives.

When 2,3,3-tri-iodo-allylalcohol is applied according to the present invention immediately as the germicidal agent of industrial agent or as an active ingredient in a germicidal composition of industrial utility, this germicidal agent or composition may be applied in such a way that 2,3,3-tri-iodo-allylalcohol is incorporated into such a finished product as fibres, fabrics and paper by impregnating, brush-applying or spraying the product with a liquid preparation containing 2,3,3-tri-iodo-allylalcohol. It is also possible to incorporate 2,3,3-tri-iodo-allylalcohol into the raw material used for or the blanks obtained in the course of the manufacture of the finished product. When 2,3,3-tri-iodo-allylalcohol is used as the slime-controlling agent in the paper-making process, this compound may be incoporated in an aqueous suspension of pulp at a concentration of 10 to 1000 parts of the compound per million parts by weight of water present. When 2,3,3-tri-iodo-allylalcohol is employed as the active ingredient in a germicidal agent or composition for the pesticidal purpose, a liquid preparation containing 50 to 1000 p.p.m. of this compound may conveniently be sprayed to crop plants. For preparing a powdery formulation of the compound, it is desirable that the powder contains 0.5 to 10% by weight of 2,3,3-tri-iodo-allylalcohol. When this compound is applied to soil, it is suitable that this compound is applied at a rate of 0.5 to 10 kg. per 10 ares of the surface area of the soil. When the compound is applied as the active ingredient of a seed-dressing agent, the seeds may suitably be immersed in a liquid preparation containing 0.05 to 1.0% by weight of 2,3,3-tri-iodo-allylalcohol.

The present invention is now illustrated with reference to the following examples from which it will be clear that 2,3,3-tri-iodo-allylalcohol is highly effective not only as the germicide of industrial utility but also as the germicide of agricultural utility. However, the present invention is not limited to the following examples.

EXAMPLE 1

This example is to determine the minimum concentrations of 2,3,3-tri-iodo-allylalcohol inhibitory to the growth of various microorganisms on agar plate culture media according to a known serial dilution method.

2,3,3-Tri-iodo-allylalcohol was uniformly incorporated into a usual semi-synthetic potato-agar culture medium, which was then serially diluted to prepare a series of culture media containing 2,3,3-tri-iodo-allylalcohol at varying concentrations of from 100 p.p.m. to 0.05 p.p.m. A 20 ml. aliquot of each of the culture media so prepared was placed in a petri dish of 9 cm. diameter and solidified in the form of a plate to which was subsequently inoculated one of the microorganisms listed in Table 1 below. The minimum inhibitory concentrations of the compound were estimated in a known manner. The results of test obtained are tabulated below.

TABLE 1

| Microorganism tested: | Minimum inhibitory concentrations, p.p.m. |
|---|---|
| Xanthomonas oryzae | 25 |
| Xanthomonas citri | 50 |
| Xanthomonas pruni | 50 |
| Xanthomonas phaseoli | 50 |
| Xanthomonas hyacinthi | 50 |
| Pseudomonas tabaci | 50 |
| Pseudomonas trifoli | 25 |
| Erwinia aroideae | 25 |
| Corynebacterium sepedonicum | 50 |
| Corynebacterium michiganense | 50 |
| Flavobacterium peregrinum | 3.2 |
| Pyricularia oryzae | 6.3 |
| Alternaria kikuchiana | 12.5 |
| Alternaria mali | 6.3 |
| Glomerella cingulata | 25 |
| Diaporthe citri | 3.2 |
| Sclerotinia sclerotiorum | 3.2 |
| Fusarium oxysporum | 12.5 |
| Corticium rolfsii | 50 |
| Cladosporium herbarum | 25 |
| Colletotrichum lagenarium | 25 |
| Botrytis cinerea | 3.2 |
| Fusarium nivale | 12.5 |
| Pythium sp. | 25 |
| Saprolegnia parasitica | 25 |
| Aspergillus niger | 3.2 |

From the above Table 1, it is seen that 2,3,3-tri-iodo-allylalcohol exhibits a high germicidal activity to a wide range of microorganisms.

EXAMPLE 2

This example is to determine the minimum concentrations of 2,3,3-tri-iodo-allylalcohol inhibitory to the growth of various microorganisms in liquid culture media according to a known serial dilution method. A stock culture of each of the microorganisms listed in Table 2 below was incubated on a slant Sabouraud's agar culture medium. Small pieces of the mycelium cake were taken off from a colony of the microorganism present on the slant culture so obtained, and each small piece was then immediately inoculated to a liquid culture medium. After the static cultivation was conducted at 28° C. for 4 days, the conditions of the growth of the microorganism were observed visually and thus the minimum inhibitory concentrations of the compound were estimated. The results of test obtained are tabulated in Table 2 below.

TABLE 2

| Microorganism tested: | Minimum concentrations for inhibition, p.p.m. |
|---|---|
| Fusarium oxysporum f. lycopersici | 5 |
| Pythium ultimum | 0.63 |
| Sclerotinia sclerotiorum | 1.25 |
| Saprolegnia parasitica | 0.32 |

From the above Table 2, it is seen that 2,3,3-tri-iodo-allylalcohol exhibits a very high germicidal activity to a variety of microorganisms also when tested in a liquid culture medium.

EXAMPLE 3

A stock culture of Flavobacterium peregrinum, one of the microorganisms producing the slime which usually occurs in the paper-making process, was inoculated at a suitable concentration of the bacteria cells to a semi-synthetic liquid culture medium containing potato. 2,3,3-Tri-iodo-allylalcohol was added at different concentrations to different portions of the semi-synthetic culture medium so inoculated, to prepare a series of test samples where the concentration of 2,3,3 - tri-iodo-allylalcohol present was serially reduced from one test sample to another test sample. In this way, the microorganism was brought into contact with the compound 2,3,3-tri-iodo-allylalcohol in each test sample for a predetermined period of time. After this, the cell cake of the microorganism was removed by filtration from each test sample and centrifugal-washed twice with a phyisological saline solution. The cell cake so washed was then inoculated to a plate culture medium and incubated, and thereafter the number of the colonies of the microorganism formed was counted. For comparison, the above procedure was repeated without the addition of 2,3,3-tri-iodo-allylalcohol. Degree of sterilization was calculated as percentages of the number of the colonies of the treated microorganism on the basis of the number of the colonies of the untreated microorganism, according to the following equation:

Degree of sterilization (percent)

$$= \left(1 - \frac{\text{Number of the colonies of the treated microorganism}}{\text{Number of the colonies of the untreated microorganism}}\right) \times 100$$

The results of test obtained are shown in Table 3 below.

TABLE 3

| Concentration of the compound | Degree of sterilization, percent | | | | |
|---|---|---|---|---|---|
| | 30 p.p.m. | 10 p.p.m. | 3 p.p.m. | 1 p.p.m. | Untreated |
| Contact time: | | | | | |
| 0.5 hours | 20 | 7 | 5 | 0 | 0 |
| 1.0 hours | 53 | 35 | 7 | 0 | 0 |
| 6.0 hours | 100 | 83 | 69 | 64 | 0 |
| 24.0 hours | 100 | 100 | 97 | 67 | 0 |

From the above Table 3, it is clear that 2,3,3-tri-iodo-allylalcohol exhibits a very high germicidal activity to *Flavobacterium peregrinum*, one of the common microorganisms producing the slime which is likely to be formed in the paper-making process.

EXAMPLE 4

This example is to test the antifungal activity of 2,3,3-tri-iodo-allylalcohol when the compound is applied onto a sheet of pulp by spraying a liquid preparation containing said compound thereonto.

2,3,3-Tri-iodo-allylalcohol was uniformly incorporated at various concentrations as indicated in Table 4 below, with several samples of a pulp. The pulp samples so treated were incubated at 28° C. for 7 days. After this incubation, the samples were visually observed to estimate the antifungal effect of the compound on the pulp according to the following ratings:

1: No effect observed
2: Slight effect observed
3: Useful effect observed.

It was observed that the microorganisms which constituted the slime formed in the incubated pulp samples were predominantly the fungus *Aspergillus niger*. The results of the tests obtained are shown in Table 4 below.

TABLE 4

| Concentrations used of the compound, p.p.m. | Antifungal effect |
|---|---|
| 0 | 1 |
| 100 | 1 |
| 200 | 3 |
| 300 | 3 |

From the above Table 4, it is seen that 2,3,3-tri-iodo-allylalcohol is actually effective in inhibiting the growth of *Aspergillus niger*, one of the fungi which usually produce the slime in the paper-making process, also when the compound was applied to the pulp by spraying.

EXAMPLE 5

2,3,3-Tri-iodo-allylalcohol was added into a pulp stock, that is, an aqueous suspension of a pulp material (1% pulp consistency) at different concentrations of 5, 10, 15, 20, 25 or 30 p.p.m. of the active compound. The pulp stock so treated was incubated at 28° C. for 7 days. After this incubation, the antifungal effect (that is, the slime-controlling effect) of 2,3,3-tri-iodo-allylalcohol was estimated in the same manner as in Example 4. The test results are tabulated in Table 5 below.

TABLE 5

| Concentrations of the active compound (p.p.m.) | Bleached soft wood Kraft pulp | Bleached hard wood Kraft pulp | Unbleached hard wood Kraft pulp | Straw pulp |
|---|---|---|---|---|
| 0 | 1 | 1 | 1 | 1 |
| 5 | 1 | 1 | 3 | 1 |
| 10 | 1 | 3 | 3 | 1 |
| 15 | 1 | 3 | 3 | 1 |
| 20 | 1 | 3 | 3 | 1 |
| 25 | 3 | 3 | 3 | 2 |
| 30 | 3 | 3 | 3 | 3 |

EXAMPLE 6

This example is to examine the effect of 2,3,3-tri-iodo-allylalcohol on the brightness and sizing value of paper.

2,3,3-Tri-iodo-allylalcohol was incorporated at different concentrations as indicated in Table 6 below, into an aqueous suspension of a bleached Kraft pulp (1% pulp consistency), and this pulp suspension treated was then made into paper in the usual manner. The sheets of paper so obtained were estimated for their brightness and sizing value according to the standard methods. The test results are shown in Table 6.

TABLE 6

| Concentrations of the active compound (p.p.m.) | Brightness | Sizing value |
|---|---|---|
| 0 | 73.1 | 42.7 |
| 5 | 73.3 | 41.8 |
| 10 | 73.2 | 39.9 |
| 50 | 73.4 | 39.8 |
| 100 | 73.2 | 41.0 |
| 500 | 73.1 | 38.6 |
| 1,000 | 72.4 | 19.2 |

From the above table, it is seen that the brightness of the paper sheet as made from a pulp stock which has been treated with 2,3,3-tri-iodo-allylalcohol is substantially the same as that of the untreated paper sheet at all the test concentrations of the active compound incorporated, and also that the sizing value of the paper sheet as prepared from the pulp stock treated is not significantly different from that of the untreated paper sheet, excepting the case when the pulp stock was treated with 1000 p.p.m. of the active compound.

EXAMPLE 7

Rice plants were cultivated in a phytotrone where the environment was so adjusted that the rice blast disease would be likely to be attacked with the rice plants cultivated therein. When the rice plants had grown to four true leaves, a spraying solution containing the compound 2,3,3 - tri - iodo - allylalcohol at a concentration as indicated in Table 7 below was applied to the rice plants uniformly by spraying. When the sprayed solution had been dried, inoculation of the rice blast fungus (*Piricularia oryzae*) to the rice plants was made by spraying a suspension containing the spores of the rice blast fungus onto the body of the rice plants. The spore suspension was also sprayed onto the other group of rice plants which were left untreated as the control. About 7 days after the inoculation, that is, when the rice plants of the control group were significantly attacked with the rice blast disease, the number of lesions of infection on leaf was counted.

Degree of the effect of the test compound to control the rice blast was evaluated by calculating according to the following equation:

$$\left[1 - \frac{\text{Average number of the infection lesions on leaf of the treated rice plants}}{\text{Average number of the infection lesions of the un-treated rice plants}}\right] \times 100$$

The tests were all made in three replications. Phyto-toxicity of the test compound to the rice plants was estimated by visual observation during the tests. No observation of the phyto-toxicity is shown by the symbol (—) in Table 7 below. The results of the tests obtained are summarised in Table 7.

TABLE 7

| Test compounds | Concentration, p.p.m. | Degree of effect, percent | Phyto-toxicity |
|---|---|---|---|
| 2,3,3-tri-iodoallylalcohol | 100 | 82 | — |
| Do | 200 | 95 | — |
| Do | 400 | 100 | — |
| Mercury phenylacetate (comparative) | [1] 15 | 97 | — |
| Untreated | | 0 | — |

[1] As Hg.

From the above Table 7, it is seen that 2,3,3-tri-iodo-allylalcohol is highly effective in the preventive treatment of the rice blast.

EXAMPLE 8

This example is to test the effect of 2,3,3-tri-iodo-allylalcohol to control the damping-off disease (*Pellicularia filamentosa*) in cucumber.

A stock culture of *Pellicularia filamentosa* was incubated on an agar culture medium to prepare an inoculum. A sterilized soil was placed in a No. 5 pot of unglazed pottery, and then seeds of cucumber were sowed in the soil. An aqueous solution containing 2,3,3-tri-iodo-allyl-alcohol at a concentration as indicated in Table 8 below was irrigated at the surface of the soil at a rate of 28.5 ml. of the solution per pot. The pot was then kept in a greenhouse. 24 hours after the sowing, the above-mentioned inoculum was placed uniformly over the whole surface of the soil in the pot to effect the inoculation. The number of the seeds which sprouted during the lapse of 3 weeks after the sowing was counted, and the number of seedlings which grew in the healthy conditions during the same 3 weeks was also counted. Percentages of the number of the sprouted seeds on the basis of the number of the seeds sowed, as well as percentage of the number of the healthy seedlings on the basis of the number of the sprouted seeds were calculated. Phyto-toxicity of the compound to the cucmber plants was estimated by visual observation with reference to the conditions of the control group of cucumber plants untreated. The tests were carried out in two replications with ten seeds sowed in each pot. The results of the tests obtained are summarized in Table 8.

TABLE 8

| Test compounds | Concentration, p.p.m. | Percentage of— | | Phyto-toxicity |
|---|---|---|---|---|
| | | Sprouted seeds | Healthy seedlings | |
| 2,3,3-tri-iodo-allylalcohol | 500 | 100.0 | 100.0 | — |
| | 300 | 100.0 | 100.0 | — |
| Pentachloronitrobenzene (comparative) | 500 | 100.0 | 100.0 | — |
| | 300 | 95.0 | 94.7 | — |
| Water (control) | 0 | 95.0 | 11.0 | — |

NOTE.—The symbol (—) in the above table means that no phyto-toxicity was observed.

As the application of 28.5 ml. of an aqueous solution containing 500 p.p.m. of the compound onto the surface area of the soil in said No. 5 pot corresponds to the dosage of 1.5 kg. of said compound per 10 ares of the field, it is clear from the results of Table 8 that even a low dosage of 2,3,3-tri-iodo-allylalcohol is effective to perform a complete control of the infection of *Pellicularia filamentosa* in cucumber plant.

EXAMPLE 9

The following materials:

| | G. |
|---|---|
| 2,3,3-Tri-iodo-allylacohol | 10 |
| Nikkol R–2010 (a trade name of a surface-active agent as produced by Nikko Shokai Co., Japan, which essentially consists of an octylphenol-formaldehyde condensate) | 5 |
| Dimethylformamide | 85 | are mixed together to give an emulsifiable concentrate which may be diluted with water for spraying.

EXAMPLE 10

The following materials:

| | G. |
|---|---|
| 2,3,3-Tri-iodo-allylalcohol | 40 |
| New Kalgen NX–131 (a trade name of a surface-active agent as produced by Takemoto Yushi Co., Japan, which essentially consists of a mixture of about 45% of polyoxyethylene alkylarylsulfonate and white carbon) | 40 |
| Diatomaceous earth | 60 | are mixed and ground together to give a composition which may be suitably used as a wettable powder and which may be diluted with water for spraying.

EXAMPLE 11

The following materials:

| | G. |
|---|---|
| 2,3,3-Tri-iodo-allylalcohol | 20 |
| Carboxymethyl cellulose | 3 |
| Bentonite | 77 | are mixed together and then shaped into a granular composition which may be applied at a rate of 3–5 kg. per 10 ares of field.

EXAMPLE 12

The following materials:

| | G. |
|---|---|
| 2,3,3-Tri-iodo-allylalcohol | 3 |
| Talc | 97 | are mixed and ground together to prepare a dust which may be applied at a rate of 3–4 kg. per 10 ares of field.

EXAMPLE 13

Propargyl alcohol (5.6 g.) was dissolved in water (120 ml.) to which elementary iodine (50.8 g.) was then added. To the mixture so obtained was added dropwise a solution of sodium hydroxide (5.17 g.) in water (30 ml.) for about 30 minutes with stirring. After the completion of the addition, the mixture was further stirred for 3 hours, and the crystalline product deposited was removed by filtration. The crystalline product was treated by washing with an aqueous solution of sodium thiosulfate, so that the crystals were decolorised. The crystals were subsequently washed with water and dried to yield 2,3,3-tri-iodo-allylalcohol (35.7 g.) in the form of needle-like crystals of a lightly brown to white color. Melting point 149–151° C. Recrystallization from acetone gave the product in the form of substantially colorless needles, m.p. 151–152° C. Concentration of the mother liquor afforded 1.6 g. of the crystals as a second crop.

The preceding examples can be repeated with similar success by substituting the generically or specifically described materials and/or operating conditions of this invention for those used in the preceding examples.

From the foregoing description, one skilled in the art can easily ascertain the essential characteristics of the present invention, and without departing from the spirit and scope thereof, can make various changes and modifications of the present invention to adapt it to various usage conditions.

What we claim is:

1. A method of controlling the growth of bacteria and fungi, which comprises applying thereto a bactericidally and fungicidally effective amount of 2,3,3-tri-iodo-allylalcohol.

2. A method of controlling slime in aqueous pulp suspension, which comprises contacting slime forming bacteria and fungi contained therein with from 10 to 1000 parts of 2,3,3-tri-iodo-allylalcohol per million parts by weight of water present in said aqueous pulp suspension.

References Cited

UNITED STATES PATENTS 3,284,515  11/1966  Dickerson et al. _____ 260—633
3,364,268  1/1968   Matsuda et al. _____ 260—633

OTHER REFERENCES

Chemical Abstracts, J9, 9255c (1963).
Chemical Abstracts, 58, 887d (1963).
Chemical Abstracts, 49, 11066f (1955).
Beilstein: "Organische Chemie," vol. I, p. 440.

ALBERT T. MEYERS, Primary Examiner

L. SCHENKMAN, Assistant Examiner

U.S. Cl. X.R.

162—161